(No Model.) 8 Sheets—Sheet 3.
M. F. CONNETT.
MACHINE FOR MAKING WIRE AND PICKET FENCE.
No. 424,276. Patented Mar. 25, 1890.

Witnesses:
Chas J Williamson
Henry C. Hazard

Inventor:
M. F. Connett
by Prindle and Russell
his Attorneys (No Model.) 8 Sheets—Sheet 4.
M. F. CONNETT.
MACHINE FOR MAKING WIRE AND PICKET FENCE.

No. 424,276. Patented Mar. 25, 1890.

Witnesses:
Chas. J. Williamson
Henry C. Hazard

Inventor:
M. F. Connett
by Prindle and Russell
his Attorneys (No Model.) 8 Sheets—Sheet 5.

M. F. CONNETT.
MACHINE FOR MAKING WIRE AND PICKET FENCE.

No. 424,276. Patented Mar. 25, 1890.

Witnesses
Chas. J. Williamson
Henry C. Hazard

Inventor:
M. F. Connett
by Prindle and Russell
his Attorneys (No Model.) 8 Sheets—Sheet 6.

M. F. CONNETT.
MACHINE FOR MAKING WIRE AND PICKET FENCE.

No. 424,276. Patented Mar. 25, 1890.

Witnesses
Chas. J. Williamson
Henry C. Hazard

Inventor
M. F. Connett
by Brindle and Russell
his Attorneys (No Model.) 8 Sheets—Sheet 7.

M. F. CONNETT.
MACHINE FOR MAKING WIRE AND PICKET FENCE.

No. 424,276. Patented Mar. 25, 1890.

Witnesses
Chas. J. Williamson
Henry C. Hazard

Inventor:
M. F. Connett
by Pundle and Russell
his Attorneys (No Model.) 8 Sheets—Sheet 8.

M. F. CONNETT.
MACHINE FOR MAKING WIRE AND PICKET FENCE.

No. 424,276. Patented Mar. 25, 1890.

Witnesses
Chas. J. Williamson
Henry C. Hazard

Inventor
M. F. Connett
by Prindle and Russell
his Attorneys

N. PETERS, Photo-Lithographer, Washington, D. C.

UNITED STATES PATENT OFFICE.

MATTHEW FRANKLIN CONNETT, OF SPRINGFIELD, ILLINOIS.

MACHINE FOR MAKING WIRE-AND-PICKET FENCE.

SPECIFICATION forming part of Letters Patent No. 424,276, dated March 25, 1890.

Application filed July 31, 1886. Serial No. 209,649. (No model.)

*To all whom it may concern:*

Be it known that I, MATTHEW FRANKLIN CONNETT, of Springfield, in the county of Sangamon, and in the State of Illinois, have invented certain new and useful Improvements in Machines for Making Wire-and-Picket Fence; and I do hereby declare that the following is a full, clear, and exact description thereof, reference being had to the accompanying drawings, in which—

Figure 1:
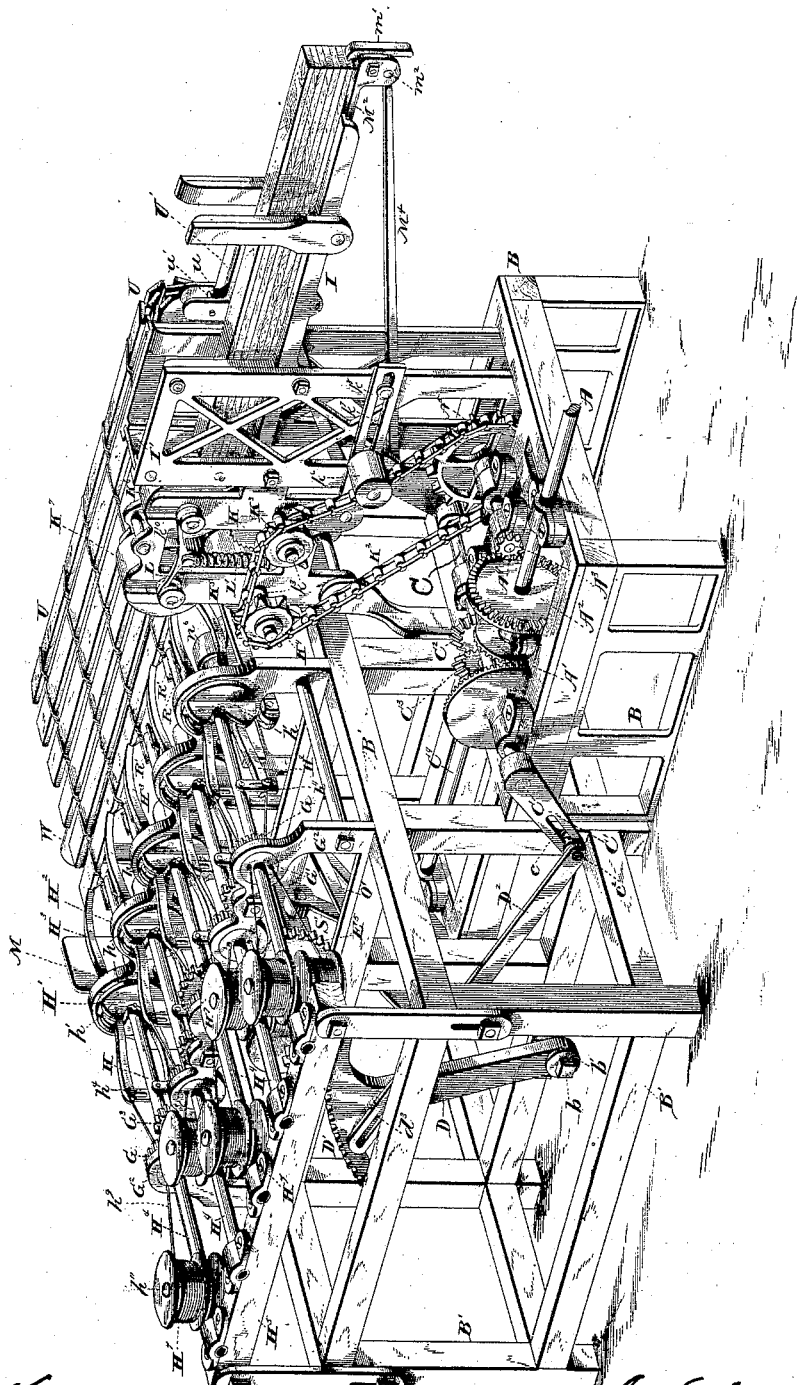
Figure 2:
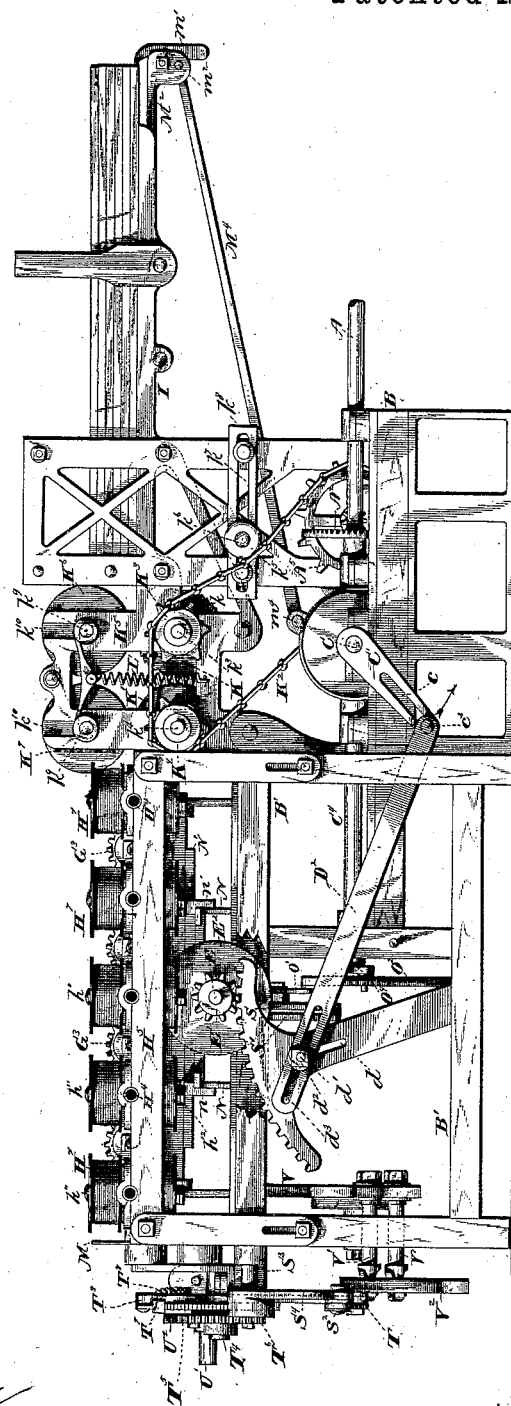
Figure 3:
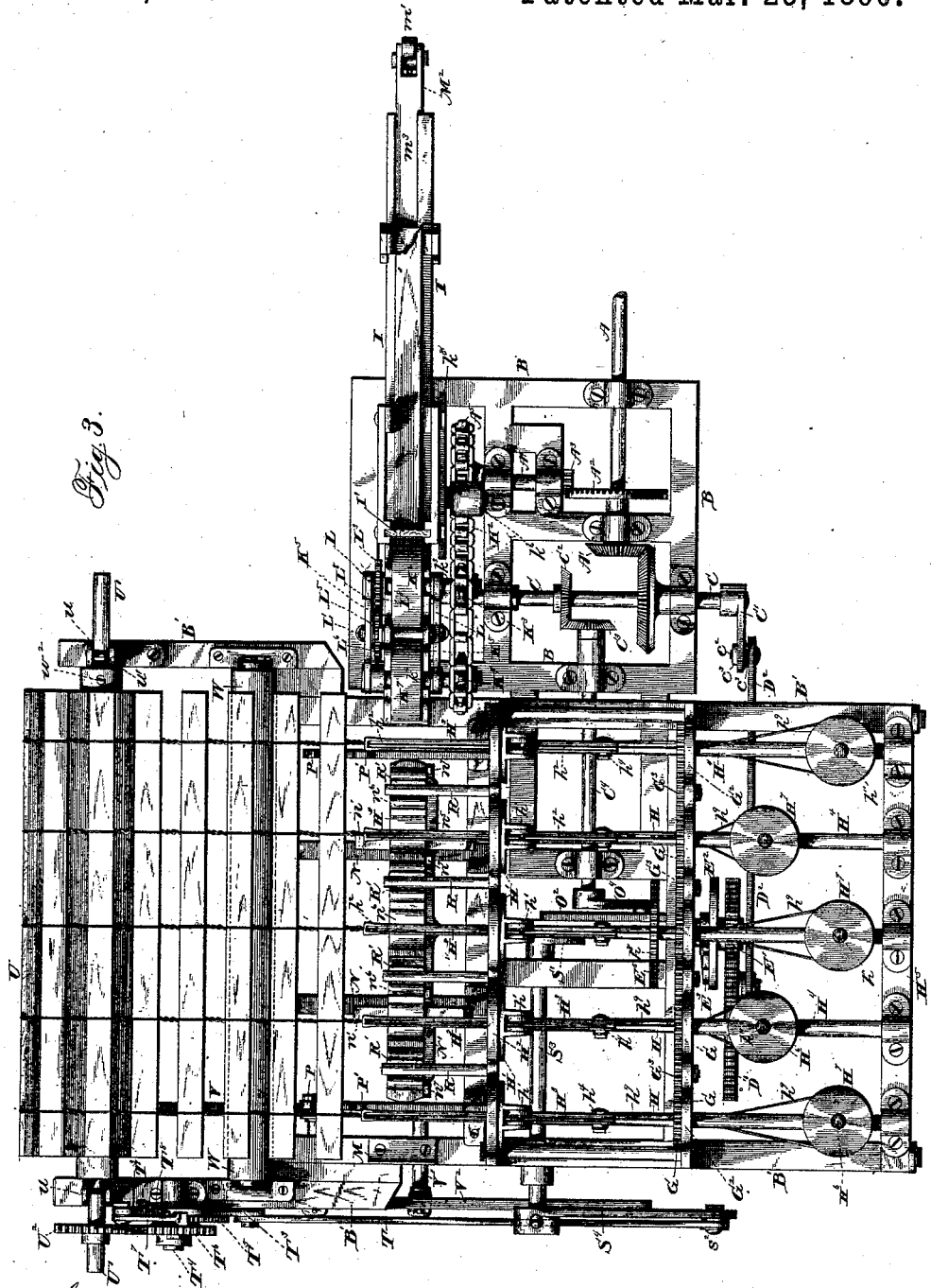
Figure 4:
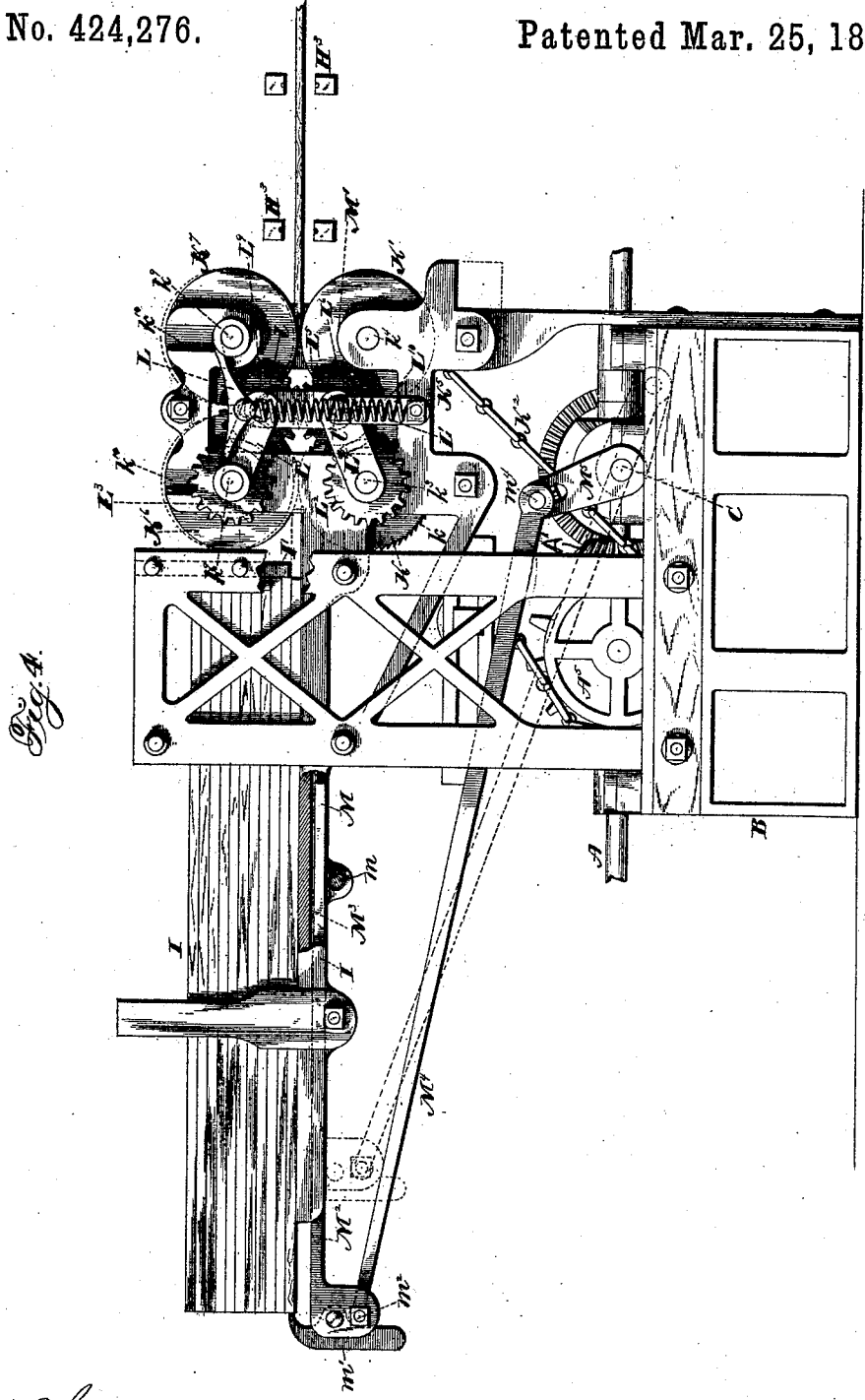
Figure 5:
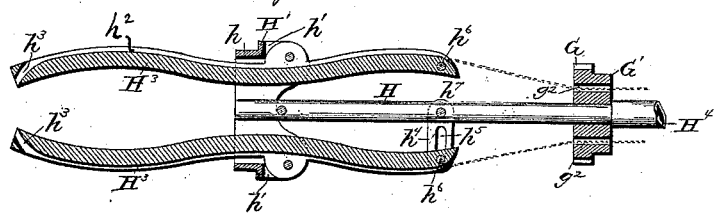
Figure 6:
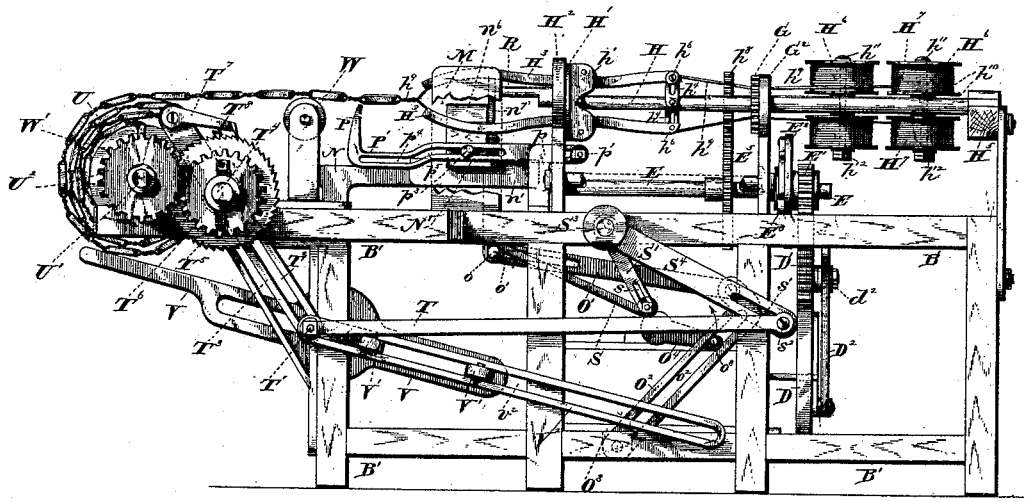
Figure 7:
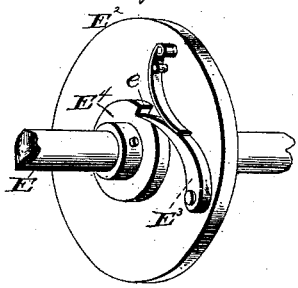
Figure 8:
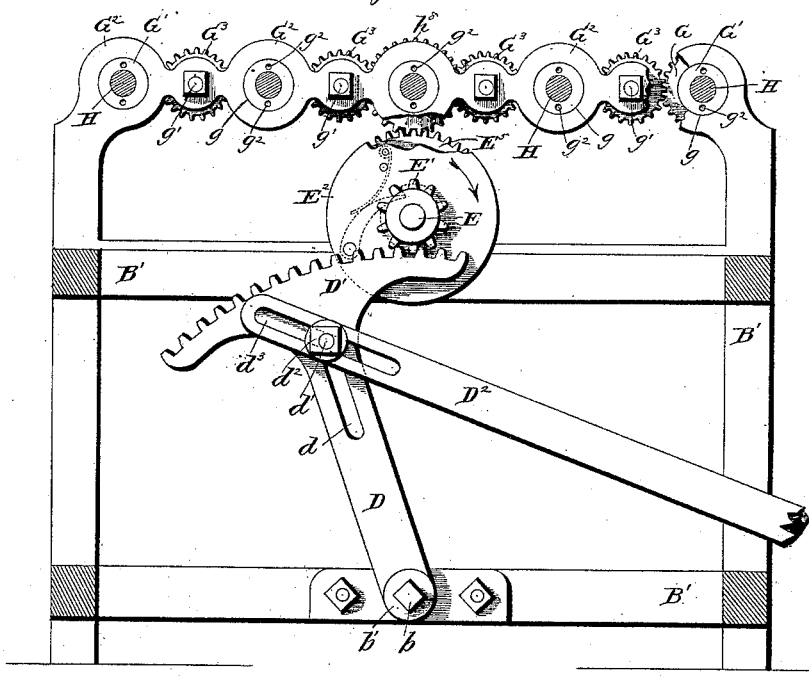
Figure 9:
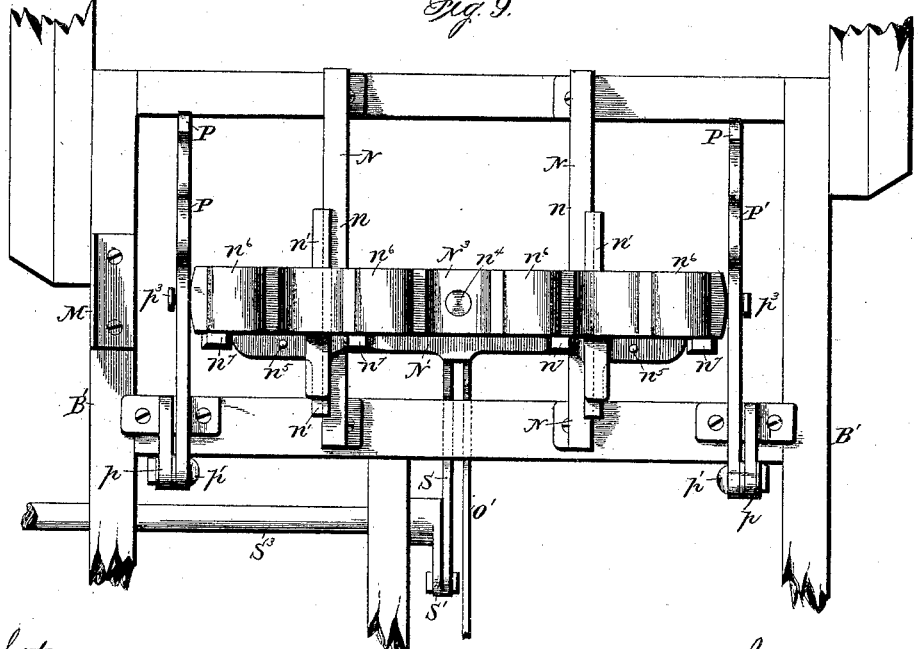
Figure 10:
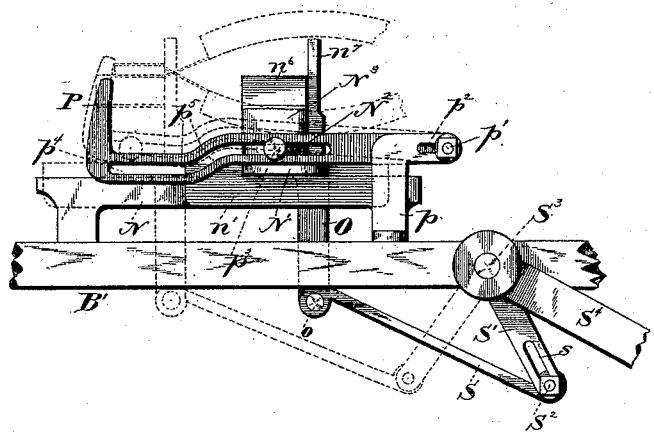
Figure 11:
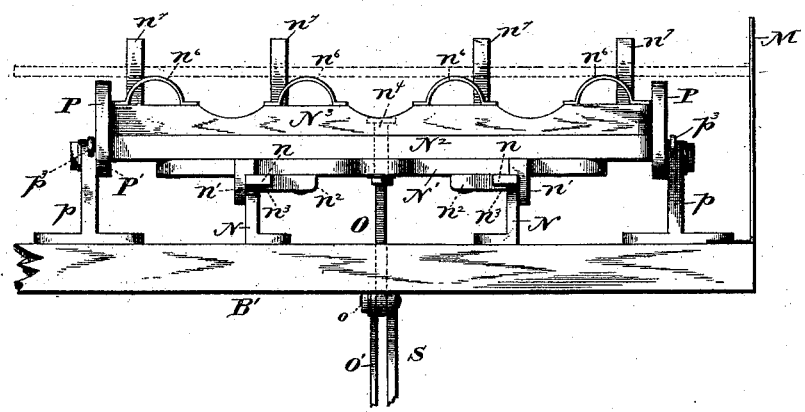
Figure 12:
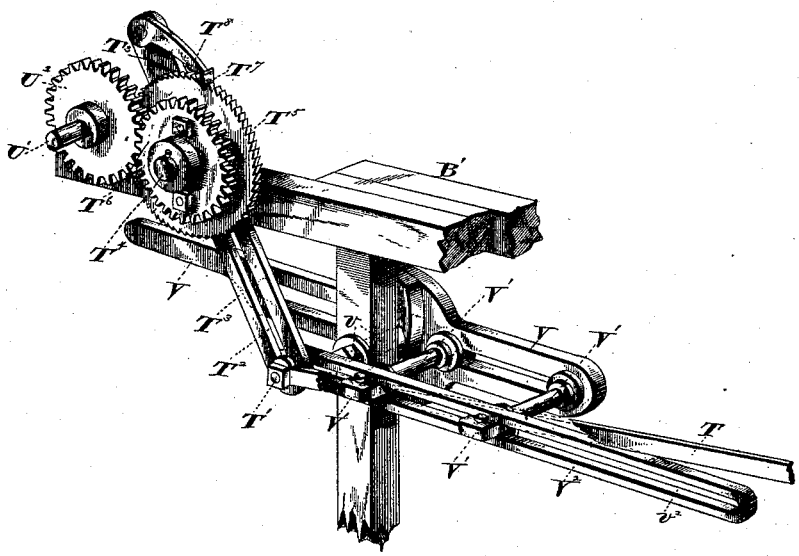
Figure 13:
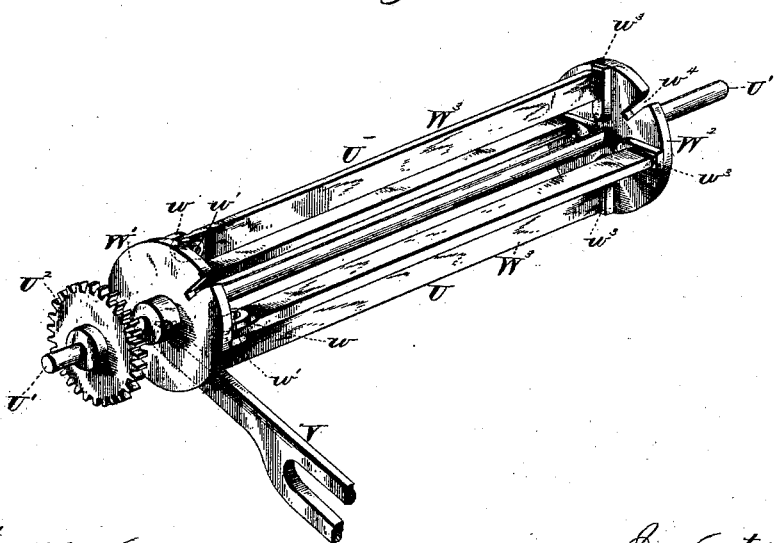

Figure 1 shows a perspective view of my machine; Fig. 2, a view of the same in front elevation; Fig. 3, a plan view of the machine; Fig. 4, a detail view in rear elevation of the picket-feeding mechanism, showing in dotted lines a picket as moved from the rack into reach of the feed-rolls, and in full lines a picket as thrown out and held in position by the feed-rolls; Fig. 5, a detail sectional view of one of the twisters with a portion of its shaft; Fig. 6, a view of the machine in side elevation; Fig. 7, a detail view of the mechanism for connecting the twister-driving shaft with the rack-driven pinion; Fig. 8, a detail front view of the mechanism for driving the twisters; Fig. 9, a plan view of the mechanism for pushing the pickets away from the twisters between the wires and insuring their proper position; Fig. 10, a side view of such mechanism; Fig. 11, a detail view in elevation of the pivoted support and pusher for the pickets; Fig. 12, a perspective view of the mechanism for turning the reel to wind up the completed fence, showing the parts as adjusted differently from what they are in Fig. 3; and Fig. 13, a detail perspective view of the reel removed.

Letters of like name and kind refer to like parts in each of the figures.

The object of my invention is to provide an improved picket-and-wire-fence machine; and to this end my invention consists in the machine and in the construction, arrangement, and combination of parts thereof, as hereinafter specified.

In the drawings, A designates the main driving-shaft of my machine, which is to receive power from any desired source or motor, and transmits it through the gearing and connecting mechanism (to be described) to the various operative parts of the machine. This shaft is journaled in suitable bearings on the frame B B. Also journaled in bearings on this frame is the shaft C, at right angles to shaft A, and driven therefrom by the bevel-pinion $A'$ on the latter shaft meshing with the corresponding bevel-wheel on shaft C. On the forward end of shaft C is fixed the crank-arm $C'$, and on the shaft between its bearings in the frame is the pinion $C^2$, meshing with and driving the pinion $C^3$ on shaft $C^4$, journaled near one end close to its pinion on the frame B B and at the other journaled in a suitable bearing on the frame $B'$ $B'$.

On the driving-shaft A is the gear-wheel $A^2$, preferably a crown-gear, as shown, meshing with the pinion $A^3$ on the shaft $A^4$, journaled on frame B B, substantially at right angles to the driving-shaft and carrying the sprocket-wheel $A^5$, for driving a part of the picket or slat feeding mechanism, as hereinafter specified.

Journaled on a stud $b$ on the lower portion of frame $B'$ $B'$ is the slotted arm D, carrying on its upper end the segmental toothed rack $D'$. This stud, as shown in the drawings, is a screw-stud screwed into one of the lower beams of the frame, and the arm D is held in place thereon by means of suitable washers $b'$ $b'$ on the stud between the arm and the stud-head $b^2$ on the one side and the arm and a nut $b^3$ on the other side. I do not, however, intend to limit myself to any particular way of journaling and holding the rack-carrying arm on its pivotal stud, nor to any particular way of or means for journaling the various shafts already described upon the frames.

The crank-arm $C'$ is preferably slotted, as shown, and through the slot $c$ therein passes the screw-threaded portion of the crank-pin $c^2$, held in place at any desired adjustment along the crank-arm by the two nuts $c^3$ $c^3$, tapped on the pin and engaging opposite sides of the arm.

Passing though the slot $d$ in the rack-carrying arm D is the pin $d'$, also screw-threaded and having screwed on it the two nuts $d^2$ $d^2$, adapted to fasten the pin at any desired adjustment along the arm by engaging opposite sides of said arm at the sides of the slot $d$, or pressing suitable washers against such opposite sides of the arm. Connecting pin $d'$ with crank-pin $C^2$ is the connecting rod or bar $D^2$, pivoted upon pin $c^2$ and provided with the slot $d^3$, engaging pin $d'$. With this construction, while the shaft C and crank C' are constantly revolving, the arm D, with its segment-rack, is driven alternately in opposite directions, with periods of rest between its opposite movements. In other words, as the crank C' revolves and throws the slotted connecting-rod first in one direction and then in the other, the rod will slide on pin $d'$ until one end of the slot $d^3$ strikes such pin. Further movement of the rod in the same direction then carries arm D in such direction. On its return movement the rod $D^2$ first moves longitudinally, sliding over pin $d'$ until the opposite end of its slot strikes and moves the pin with the rack in the direction opposite to that of its previous movement. For the purposes of description I assume the front of the machine to be the side opposite to that at which the completed fence is delivered. The rack-arm D is then near the front of the machine and swings in a plane parallel to such front.

Journaled in the frame B' B', above the segment rack or gear D', is the shaft E, upon which is journaled the pinion E', meshing with the teeth of rack D' and rigidly connected with the disk $E^2$, carrying the spring-pawl $E^3$. Fixed to shaft E is the collar $E^4$, provided with the ratchet tooth or notch $e$, adapted to be engaged by the pawl $E^3$ when the pinion E' and pawl-disk $E^2$ are revolved forward or in the direction indicated by the arrow in Fig. 6. The shaft E will then be caused to turn with the pinion. Upon shaft E is also fixed the gear-wheel $E^5$, for the purpose to be hereinafter described.

Extending across the top of frame B' B', above and to the front of wheel $E^5$, is a series of gear-wheels G G, each having a hub G' journaled in a bearing $g$ therefor in the cross-bar $G^2$ of the frame. These wheels are connected together by the pinions $G^3$ $G^3$ between and meshing with them, such pinions being journaled on studs or pivot-bolts $g'$ $g'$, attached to bar G. Fixed in and extending through the wheels G G and their hubs are the twister spindles or shafts H H. At their rear ends these spindles are provided with the fixed heads H' H', each one of which has on its rear side a reduced portion $h$, journaled in a journal-opening $h'$ on the cross-bar $H^2$ on top of frame B' B'. On opposite sides of each of the twister-spindles two lever-arms $H^3$ $H^3$ are pivoted in ears $h'$ $h'$ on the front side of the head H'. These lever-arms extend rearward through the head and the journal-opening in bar $H^2$, and on their outer sides are provided with the longitudinal channels or grooves $h^2$ $h^2$, communicating at the rear ends of the arms with inward openings $h^3$ $h^3$. The rear ends of the twister-arms are preferably curved inward toward each other, as shown in the drawings.

To hold the twister-arms from swinging on their pivots, I provide the links $h^4$ $h^4$, attached at their inner ends to the twister spindle or shaft and at their outer ends connected with the forward ends of the pivoted arms. To make said arms adjustable, so as to bring their rear ends closer together or farther apart, as desired, I slot each of the links $h^4$ at $h^5$ and provide each of the arms with a bolt or screw $h^6$, passing through the slot in the link. A washer between the outer side of the link and the head of the screw serves to clamp the link firmly against the side of the twister-arm when the screw is screwed inward. The inner ends of the links $h^4$ $h^4$ are preferably attached to the shaft H by a pivot pin or stud $h^7$ to allow slight swinging of the links as the twister-arms are being adjusted; but this is not at all necessary, as the slots $h^5$ $h^5$ can be made broad enough to allow sufficient play of the bolts on the twister-arms with the links fastened rigidly to the shaft. The middle one of the twister spindles or shafts, of which I show five, is provided with the pinion $h^8$, meshing with and driven by the gear-wheel $E^5$ on shaft E, already described. Fewer or more twisters, with their spindles, can of course be used, as desired, and the pinion $h^8$ can be placed on any one of the spindles or shafts. With the shafts geared together by means of the wheels G G, fixed on them, and the pinions $G^3$ $G^3$ between and meshing with such wheels, as the wheel $E^5$ is turned to drive pinion $h^8$ the twister-shafts and the twisters will all be caused to revolve together and in the same direction. As the wheel $E^5$ is only driven at intervals and always in the same direction by the mechanism already described hereinbefore, the twisters are correspondingly revolved intermittingly and only in one direction. Their shafts are so geared together by the wheels G G and pinions $G^3$ $G^3$ and so connected by gearing with wheel $E^5$ that when they come to a rest the two arms of each twister stand one above the other in a vertical plane passing through the twister-shaft. There is then, when the twisters are at rest, a clear passage-way between the twister-arms from side to side of the series of twisters, (shown in the drawings,) through which way a slat or picket can be freely thrown or thrust endwise. Passing through each of the wheels G and its hub G' are two holes $g^2$ $g^2$, diametrically opposite to each other and substantially opposite to and in the same plane with the rear ends of the twister-arms. Attached to the forward ends of the twister-shafts where they project through the hubs of gear-wheels G G are the shafts $H^4$ $H^4$, whose forward ends are journaled in suitable bearings in the cross-bar $H^5$ of the frame. This bar I have shown as adjustably supported from the main portion of frame B' B'; but I do not limit myself to such construction.

The shafts $H^4$ $H^4$ are shown as made hollow, with their rear ends fitting over and pinned to the ends of the twister shafts or spindles. Instead of being hollow, they can obviously be made solid, with sockets on their ends to receive and be pinned to the spindle ends, or they can be connected with the twister spindles or shafts in other ways. Upon rods $H^6 H^6$, passing through or attached to the shafts $H^4 H^4$, and extending on opposite sides thereof, are the spools or reels $H^7$ $H^7$, carrying the wire for twisting. From such spools, being on opposite sides of the shafts, the wires $h^9 h^9$ are led rearward through the holes or openings $g^2 g^2$, through the wheels G G and their hubs, along the grooves in the outer sides of the twister-arms and inward through the openings $h^3 h^3$ at the rear ends of such arms.

I contemplate providing the wire reels or spools with any desired form of tension device or means for bringing friction to bear upon the spools to resist their turning, so as to put the wires as fed from them to the twisters under proper tension. In the drawings I have shown with some of the spools or reels one form of device for producing friction. Between such reels and the twister-shafts I place upon the pivot-rods $H^6 H^6$ washers or pieces $h^{10} h^{10}$, of yielding material—as, for instance, rubber. With this construction, if the reels be forced or drawn inward upon the rods $H^6 H^6$ by nuts or other means, these washers will produce friction acting against the revolution of the spools, so as to put the wire as drawn out under tension.

The rods $H^6 H^6$, as shown in the drawings, pass loosely through openings in shafts $H^4 H^4$, and each one has on one end a head or collar $h^{11}$, adapted to engage the outer side of one of the reels, and on the other a nut $h^{12}$, adapted to engage the outer side of the other reel. With this construction, as the nut $h^{12}$ on any rod is screwed inward, both reels will be caused to press against the washers or friction-pieces equally, so that they will be subjected to equal friction, and the two wires of each pair will be put under the same tension as they are drawn out through the twisters. If one reel tended to press against its friction-piece more than the other, obviously the pivot-rod $H^6$ would be moved longitudinally through the shaft $H^4$ until the pressures became equal.

Instead of the washers or friction-pieces, such as described, between the reels and the shafts $H^4 H^4$, spring-washers or friction devices of various forms can be used, as desired.

For automatically feeding the necessary pickets or slats into place between the twister-arms, and therefore between the wires running over and from such arms, I have provided the following mechanism: In feeding the slats into position between the arms it is very desirable that such slats be thrown accurately and suddenly into place, so that the twisters need not long stay at rest. At the right-hand side of the machine, at right angles to the twister-spindles and in line with the openings between the twister-arms when the twisters are at rest, is the upright rack I, supported upon a frame extending upward from frame B B. The rack proper, in which the slats or pickets are held piled one upon the other, does not extend to or near the series of twisters. At its inner end is the plate or piece I', which closes such end, except at the bottom of the rack, where an opening is left below the end of the plate sufficient to let a single slat (the bottom one in the pile) pass inward to the twisters. Between the rack and the series of twisters two feed-rollers K K' are journaled, having their upper faces in a plane a little above the plane of the rack-bottom. The first of these rollers has upon its periphery a series of teeth $k$ $k$. Both of these rollers are continuously driven during the operation of the machine by a sprocket-chain $K^2$, running around the sprocket-wheel $A^5$, described hereinbefore, and over the sprocket-wheels $K^3$ and $K^4$ on the shafts $k^3$ and $k^4$ of the two rollers K and K', respectively. To keep such chain under proper tension, I provide the tension-roller $k^5$, engaging it, said roller being pivoted on a stud $k^6$, made adjustable in a slot $k^7$ in a plate $k^8$ on the upright rack-frame. The shafts $k^3$ and $k^4$ of the feed-rollers K and K' are journaled in upright plates or standards $K^5 K^5$, between which the rollers revolve and which stand at the sides of the way along which the slats are passed to the twisters. Above the feed-rollers K and K' are the rollers $K^6$ and $K^7$, respectively. Both of these rollers have their pivot-shafts $k^9 k^9$ journaled in upright slots $k^{10} k^{10}$ in the plates $K^5 K^5$, so that the rollers are free to rise away from or move toward the feed-rollers below them. To draw these upper rollers downward, I provide at each side a yoke L, resting upon the projecting shafts of the rollers, and connect with such yoke a spring L', drawing downward on the yoke. The two yokes thus pressing the roller-shafts down cause the rollers to press any slat passing below them down upon the lower feed-rollers. A slat projected from the rack between the toothed feed-roller K and the pressure-roller above, as indicated by dotted lines in Fig. 5, will then be gripped firmly between the rollers and carried positively forward with a speed equal to that of the periphery of the toothed roller K. Passing over the revolving roller K' and between it and the pressure-roller above, the slat is carried forward forcibly and quickly and projected between the twister-arms into the position shown in full lines in Fig. 5. The shaft of the roller $K^6$, above the toothed roller K, is connected by gearing with and driven from the shaft of such latter roller. Upon the shaft of roller K is a pinion $L^2$, and upon the shaft $k^9$ of the roller $K^6$ is a similar pinion $L^3$. Pivoted upon the shaft of roller K, on opposite sides of pinion $L^2$, are the two plates or links $L^4 L^4$, connected at their outer ends by means of a hollow pivot pin or bolt together and to the lower ends of two parallel plates or links $L^5$ $L^5$, between which and journaled upon the pivot-pin is the pinion $L^6$, meshing with pinion $L^2$, so as to be driven thereby. Pivoted upon shaft $k^9$ of the upper roller $K^6$, on each side of the pinion $L^3$ thereon, are the two plates or links $L^8 L^8$, like plates $L^4 L^4$, already described, and connected by a pivot pin or bolt $l$ (shown hollow) with the upper ends of plates $L^5 L^5$, upon which pivot-pin is journaled between the latter plates the pinion $L^9$, meshing with pinions $L^6$ and $L^7$. With this construction the upper roller $K^6$ is driven from and with the roller K by means of the pinions $L^2$, $L^6$, $L^7$, and $L^9$, meshing with each other and always kept in gear by the links, while said upper roller is free to move from or toward the toothed roller.

Attached to the frame at its lower end and at its upper end connected with the gear-carrying links by means of a bolt $l'$, passing through the hollow stud connecting links $L^4 L^4$ and $L^5 L^5$, is the plate $L^{10}$, serving to keep the pivotal connection of these pairs of links from moving too far vertically.

On the opposite side of the series of twisters from the picket-rack and feed-rollers and in line therewith is the upright plate M, forming a stop for the picket or slat thrown through the twisters by the feed devices. This stop is so situated with relation to the inner pair of feed-rollers $K' K^7$ that when the picket or slat is at one end in contact with the stop its other end will still be in contact with or engaged by the rollers $K' K^7$, as shown in Figs. 5 and 11. The rollers will then keep the slat from rebounding when it strikes the stop M, and will hold it in place between the twister-arms until it is moved rearward out from between the twister-arms by the devices to be hereinafter described. To allow of the slat or picket being thus moved bodily rearward, the frame in which the feed-rollers are journaled is cut away or left open at $M'$ on its rear side, such opening being opposite the space between the two inner feed-rollers $K' K^7$. To feed the bottom slat from the slat-rack into position to be gripped by the constantly-revolving feed-rollers K $K^6$, I provide the feed-slide $M^2$, guided in a way $M^3$ underneath the rack and supported in such way upon the pins or bolts $m\ m$. On the outer end of this slide is pivoted the pawl $m'$, having its lower end weighted, so that the pawl tends to stand normally in an upright position, and having its upper end adapted to engage the outer end of the lowest slat in the rack when the slide stands in its outward position, as shown in Fig. 5. The bolt $m^2$ on the slide serves as a stop to prevent the backward swinging of the pawl as it engages a slat and is drawn inward. To allow the inward movement of the pawl with the slide, the bottom of the rack is slotted at $m^3$, as shown in said figure. After the slide and pawl have fed a slat inward and begin to move outward the upper end of the pawl swings readily downward, so as to pass along under the slat now at the bottom of the pile in the rack, as will be readily understood. To actuate the slide, I provide the rod $M^4$, connected at one end by means of the bolt $m^2$ with the slide and at the other pivoted to the crank-pin $m^4$ on the crank $M^5$ on shaft C, already described hereinbefore. This crank is shown as slotted and the crank-pin as adjustable in the slot to regulate its throw; but such construction is not necessary to my invention. The crank on the other end of this same shaft serves to drive the twisters intermittingly through the means of suitable connecting gearing and mechanism, as described hereinbefore. It is easy, therefore, to relatively adjust the times of operation of the twisters and the feed-slide by fixing the two cranks on the shaft in the proper relative positions. The crank $M^5$ is so fixed on the shaft as to begin to draw the rod $M^4$ and slide $M^2$ inward a short time after the crank $C'$ has completed its inward throw to revolve the twisters. This leaves a short space of time between the stopping of the twisters and the feeding of the new slat into position between their arms.

Attached to frame $B' B'$, below the series of twisters and extending rearward, are the parallel bars N N, having, preferably, the side ribs or flanges $n\ n$ on their inner sides. On these bars rests and slides the cross-plate $N'$, having guides $n'\ n'$, engaging the outer sides of the bars N N, so as to keep plate $N'$ always at right angles to them as it moves back and forth over them. Attached to said plate on its under side are the smaller plates $n^2\ n^2$, having flanges $n^3\ n^3$, engaging the under sides of the ribs $n\ n$ on bars N N. Pivoted to the plate $N'$ by the pivot-bolt $n^4$ is the bar $N^2$, the motion of which on bolt $n^4$ is limited by stops $n^5\ n^5$ on plate $N'$. On top of bar $N^2$ is fastened the second bar $N^3$, having opposite the spaces between the twisters the rounded or arched pieces $n^6\ n^6$, preferably made of sheet-metal bent into the arched form and attached to the bar, as shown. When the plate $N'$ and bars $N^2\ N^3$ are in their forward position, as shown in Figs. 4 and 9, and the twisters are at rest, the upper sides of pieces $n^6\ n^6$ form supports over which the slat or picket slides as it is thrown inward between the twister-arms, and which serve to support the slat on a level with the openings between the ends of the twister-arms. As the plate $N'$ is moved rearward the slat resting on the supports $n^6\ n^6$ can be carried with it between and clear of the twister-arms. Attached to bar $N^2$ are the upright arms $n^7\ n^7$, adapted to engage the rear side of a slat resting on said supports on bar $N^3$. On the lower side of plate $N'$ is the rigid arm O, which is provided with the pivot bolt or pin $o$, engaging the slot $o'$ in the bar $O'$, which bar is pivotally connected at its forward end with swinging slotted arm or lever $O^2$. This arm is pivoted at its lower end to a bar $O^3$, attached to frame $B' B'$. In the slot $o^2$ of the arm plays the crank-pin $o^3$ of the crank $O^4$ on the shaft $C^4$, described hereinbefore and driven by suitable gearing $C^2 C^3$ from the same shaft C from which the twister-driving and the feed-slideoperating mechanisms are driven. With the crank revolving in the direction indicated by the arrow in Fig. 2 the crank-pin travels toward the rear of the machine when it is at its highest point and toward the front at its lowest position. The arm or lever $O^2$ will then be swung slowly to the rear and quickly back again toward the front by the crank-pin, because such pin on its rearward travel engages the side of the slot in the arm near the outer end of the latter and on its forward travel engages it near the pivotal point of the arm. As the bar $O'$, actuated by the lever $O^2$, is connected with the plate $N'$ by a slot and pin, as described, the plate $N'$ will obviously have periods of rest at opposite ends of its movements, while the bar $O'$ moves longitudinally on the pin $o$ until the ends of the slot $o'$ strike the pin. With the construction described the bar $N^3$, forming the carrier to carry the slats rearward between the wires issuing from the twister-arms, is slowly moved rearward, with a slat resting upon the arched supports $n^6\ n^6$ and engaged at its rear side by the lugs or uprights $n^7\ n^7$, until the slat is carried clear of the twister-arms and against the twists made in the wires behind the last previous slat or picket. As the slat emerges from between the twister-arms it engages with its rear side the twists in the wires, and, pressing against them, draws the pairs of wires out a sufficient amount to inclose the slat when the twists are made. The outward or rearward movement of the slat-carrier is made slowly and with great power, as the crank-pin is then engaging the portion of the pivoted connecting-arm $O^2$ farthest from its pivot.

In fence-making machines as heretofore made, where a non-pivoted carrier has been used to carry or push the slat or picket against the twists in the wires, so as to draw out the wires from the twisters, if the lath should be slightly tapering or larger at one end than the other, the wires at one end of the series of twisters will obviously be drawn out farther than the others. If then this tapering lath or slat be twisted in, even if all straight or regular laths be woven or twisted in afterward, they will all have the same lead, so that they will all be inclined out of a right angle to the lines of twisted wires and the looks of the fence will be spoiled. Where, on the other hand, it is attempted, as heretofore, to pull out the wires by the pull of the reel reeling up the completed fence, a straight fence cannot be insured, as one or a few laths thicker at one end than at the other will cause the wires to run at that end until a lath thicker at the other end causes the wires to run at that end. As a result we find in a bundle of fence made by machines using such means of drawing out the wires one lath or slat leaning one way and the next or a neighboring one leaning the other. To avoid these objections to machines as heretofore made and used and insure the making of regular and straight fence under all circumstances, and even with irregular and tapering slats, I have pivoted my carrier as described, and have also provided the stops P P, against which the rear or outer side of each slat or picket is carried and firmly pressed by the carrier. Where the slat is tapering, the carrier will swing upon its pivot to compensate for the taper. These stops always maintain the same position with relation to the twisters, so that a line drawn through their forward faces will always be parallel to the line or plane of the rear ends of the series of twisters and at right angles to the wires issuing from the twisters. With the carrier pushing each slat outward squarely against these stops, as described, the twists in the wires will always be carried forward equally by the outer sides of the slats, and such sides of the slats will all be exactly parallel in the completed fence.

The stops P P are the upturned ends of arms $P'\ P'$, pivoted to brackets or arms $p\ p$ on the frame $B'\ B'$. These brackets are slotted, so as to allow of adjustment of the pivots of the stop-arms toward or from the rear of the machine, the pivot-pins $p'\ p'$ being for this purpose passed through and adjustably fastened in the slots $p^2\ p^2$. To raise the stops when a slat is being moved out by the carrier and drop them again when the carrier is retracted, I provide the opposite ends of the carrier with pins $p^3\ p^3$, which engage and play in slots $p^4$ in the stop levers or arms $P'\ P'$. The outer or rear portion of each of these slots is lower on the arm than the forward portion, and is connected therewith by an inclined portion $p^5$. While the carrier is retracted the pins $p^3\ p^3$ will be in the upper portions of the slots, and the stop-arms will then be down, so that the stops P P are below the level of the rearward travel of the slats on the carrier. As the carrier is moved rearward with a slat, the pins $p^3\ p^3$, riding along the slots, will raise the arms to bring the stops up into position to engage the slat, and will keep them so until the carrier is retracted again. The arms are then dropped, so as to release the slat and allow it to be drawn along by the reel winding up the completed fence. To properly guide each slat as it is thrown by the feed devices in through the twisters and over the rounded supports $n^6\ n^6$ on the carrier, I provide between the twisters the arms R R, attached to and extending rearward from the cross-bar $H^2$, in which the twister-heads are journaled. Each of these arms has a plate $R'\ R'$ on its under side, turned up at its ends, so as to make a rounded guide for the upper side of the slat, corresponding with and opposite the rounded supports and guides $n^6\ n^6$ on the carrier. An unobstructed way for the slat is thus furnished and the slat is guided clear of the twister-arms.

Where a reel for reeling up the completed fence is driven positively, it is necessary to provide some means for compensating for the change in diameter of the roll on the reel, so that the outer periphery of such roll shall always travel at the same speed. It is therefore necessary that the reel should revolve slower and slower as the roll or bundle of fence upon it grows larger. With this end in view I provide automatic mechanism for adjusting the throw or motion of the reel-turning device according to the size of the bundle on the reel. As it is desirable that the reel should not turn except when the carrier is moving outward to carry the slat rearward between the wires, I actuate the reel-turning devices from the carrier itself. Pivoted to the bolt or pin $o$, to which the carrier-operating bar is connected, is the link S, pivoted to crank-arm S' by the crank-pin $S^2$, preferably made adjustable, as shown, in the slot $s$ in the crank. Said crank is on the rock-shaft $S^3$, journaled in suitable bearings on frame B' B'. On the outer end of this shaft is the crank-arm $S^4$, also slotted at $s'$, and provided with the crank-pin $s^2$, adjustably fixed in the slot. Pivoted upon this pin is the connecting-rod T, having at its rear end a bolt or pin T', loosely engaging the slot $T^2$ in the swinging lever $T^3$, pivoted upon the stud $T^4$ on the machine-frame. Upon this stud outside of the lever are journaled the ratchet-wheel $T^5$ and the gear-wheel $T^6$, rigidly attached to wheel $T^5$, so as to turn therewith. A pawl $T^7$, pivoted upon the upper portion of lever $T^3$ and drawn downward by spring $T^8$, engages the ratchet-wheel teeth, so as to turn the wheel at each movement of the upper end of the lever toward the front of the machine. As the carrier moves outward or rearward, the rock-shaft $S^3$ is, through the link S and the crank-arm S', rocked, so as to carry the crank $S^4$ rearward. From this crank the lower end of the pawl-lever $T^3$ is carried rearward by means of the connecting-rod and its pin engaging the slot in the lever, so as to move the upper pawl-carrying end of the lever in the direction to cause the pawl to turn the ratchet and gear wheels, as described above. The reel U has the ends of its pivot-shaft U' journaled in bearings $u$ $u$, from which they can be easily lifted when the reel is to be removed to take off a bundle of fence. Pins $u'$ $u'$ can be used, if desired, to hold the journal ends of the shaft down in their bearings.

To facilitate the removal of the reel when desired, the reel-shaft is only connected with the driving-gearing described by means of the pinion $U^2$, fixed on one end of the shaft meshing with the gear-wheel $T^6$ when the shaft is in its bearings. With this construction the reel can, when desired, be easily removed by lifting it until its shaft ends leave their bearings, the reel being, if necessary, allowed to rotate slightly as it is raised on account of the engagement of the teeth on the pinion and gear-wheel disk. The throw of the pawl-carrying end of the pawl-lever $T^3$ can obviously be made greater or less by moving the end of link or connecting-rod T and the pin T' therein nearer to or farther from the pivot of the lever. To cause the link end and pin to move nearer the pivot of the pawl-lever as the roll on the reel increases in size, I provide the lever V, pivoted to a stud $v$ on one of the frame-uprights. This lever at its rear end projects under the reel, so as to rest up against any material rolled thereon, and its forward arm is provided with the two pins V' V', projecting outward from its side. These pins engage a slot $v^2$ in the long slotted bar $V^2$, pivoted at its rear end on the pin T', which is attached to the connecting-rod T and plays in the slot in the pawl-lever $T^3$. With this construction, as a roll of fence gathers upon the reel and increases in size, the end of lever V engaging the roll is depressed, thus raising the forward end of the lever with its pins V' V'. These pins, engaging the slot in bar $V^2$, cause it to tilt with lever V, carrying the pin on the connecting-rod T down in the slot in pawl-lever $T^3$ away from the pivot of the lever. The throw of the rod T will then move the lever $T^3$ a distance less in proportion to the increased distance of the pin from the lever-pivot, and the pawl will revolve the ratchet-wheel and the reel each time an amount inversely proportional to the size of the roll on the reel. In other words, the rate of revolution of the reel-shaft will be diminished in proportion to the increase in diameter of the roll of fence on the reel. The weight of the forward end of the lever V, the pins V' V', and bar $V^2$ serve to keep that end of the lever pressed downward and the other end upward toward the reel.

To guide the completed fence from the twisters above the stops when the latter are depressed and to the reel, I have provided the transverse roller W, journaled at its ends in suitable bearings on the frame. In order to facilitate the removal of a roll of fence from the reel, said reel is composed of two heads W' $W^2$, fixed on the shaft. Of these heads W' is provided with pairs of ears $w$ $w$ on its inner side parallel to radii of the head, and in these ears are pivoted by pins or screws $w'$ $w'$ the ends of the longitudinal bars $W^3$ $W^3$, forming the main outer portion of the reel. The other head $W^2$, preferably fixed to the shaft by a set-screw $w^2$, so that when the screw is loosened the head can be moved longitudinally upon the shaft, has the sockets $w^3$ $w^3$ on its inner face, adapted to receive the ends of the bars $W^3$ $W^3$. When the reel is removed from its bearings, the screw $w^2$ loosened, and the head $W^2$ slipped outward off the shaft, disengaging the sockets from the bar ends, the bars will swing inward on their pivots on the other head, and the roll of fence can be easily slid off the reel. A notch $w^4$ is provided in each of the ends or heads W W' of the reel, into which the ends of the end slat or picket in a piece of completed fence coming from the twisters can be inserted.

The length of the fence being thus connected with the reel, as the latter revolves it will wind the fence up regularly.

The operation of my machine, constructed as shown and described, is, briefly, as follows: With the parts in the positions as shown in Figs. 1, 2, and 3, as the shaft A is turned in the direction of the arrow in Fig. 1 the feed rolls or wheels will be driven continuously through the gearing and mechanism described and shown; but no slat will yet be moved inward by them, as all the slats are in the rack out of reach of the outer pair of wheels. The crank C' will be swung as indicated by the arrow in Fig. 2, and will draw the slotted pitman or connecting-rod $D^2$ outward until the farther end of the slot $d^3$ in such rod engages the pin on the segment-rack arm. Such arm is then drawn outward, turning the pinion E' and pawl-carrying disk $E^2$ on the shaft E. During such turning of the pinion and disk the pawl $E^3$ rides over and does not engage the ratchet shoulder or notch on the collar $E^4$, fixed to shaft E. While this is going on the crank $M^5$ is revolved, so as to draw the rod $M^4$, with its pawl $m'$, inward to push the bottom slat in the rack between the two outer revolving feed rollers or wheels. The teeth on the lower of these wheels grip the slat positively, so that by the action of such wheel with the others the slat is carried positively and quickly through between the arms of the twisters, where it is supported upon the arched pieces on the carrier, as already described herein. The slat is held longitudinally in position with its farther end resting against the stop M by the action of the inner pair of feed-wheels still engaging its other end. Through the mechanism described and shown the carrier, with the slat supported thereon, is now moved rearward to carry the slat clear of the twisters and against the twists previously formed in the wires behind the preceding slat. As the carrier is thus moved rearward with its slat, the stops P P are raised up in the path of the slat, and said slat is moved squarely against them, the carrier swinging a little on its pivot if the slat is tapering, so that the front edge of the slat can bear at or near both ends against the stops. As stated, this arrangement insures that the rearward sides of all the slats in the fence as made shall be parallel whether the slats are straight or tapering. While the slat is thus being moved rearward between the wires from the twisters the arm $S^4$ is, by the mechanism connecting it with the carrier, swung rearward, so as to swing the pawl-lever $T^3$ and cause the pawl $T^7$ to turn the ratchet-wheel and reel. The reel being thus turned draws the completed fence rearward from the twisters as the new slat is moved out from between the arms of the latter. The means and mechanism for adjusting the throw of the arm $T^3$ as the coil or roll on the reel increases, so as to cause the outer periphery of such roll or coil to always travel the same distance each time the reel is turned, have been set forth at length hereinbefore. While these several operations have been going on the crank C' has turned so as to move the rod or pitman $D^2$ inward again. Such rod moves independent of any motion of the segment-arm D until the end of the slot in the rod strikes the pin on the arm. Said arm is then swung back to its original position, again causing, through the engagement of the rack and pinion E', the pawl-carrying disk $E^2$ to revolve. The pawl on the disk now engages the ratchet notch or tooth on the collar on shaft E and causes such shaft to revolve with disk $E^2$. From this shaft the twisters are, through the connecting-gearing set forth, all revolved together to twist the wires behind the new slat. The twisters stop each with its two arms in a vertical plane to have passage for another slat between them. As soon as the twisters stop the carrier is retracted again into position to receive such new slat.

I do not limit myself to the particular forms of gearing and connecting driving mechanism between the various parts of the machine. For instance, the feed wheels or rolls can obviously be continuously driven by other means than by sprocket-wheel and chain connection with shaft $A^4$. The twisters also can be driven by any other desired form of gearing.

The operation of the devices and mechanism for turning the reel and compensating for the increase in the size of the roll thereon, so as to cause always equal amounts of completed fence to be wound on the reel, is as follows: The crank-arm $S^4$ always swings the same distance, giving the rod or connecting-bar T always the same throw. This throw can of course be adjusted by setting the crank-pin nearer to or farther from the center of movement of the crank. When this adjustment is made, however, the throw of the rod will remain uniform. As the rod or bar T is connected with the slotted pawl-lever $T^3$ by the pin playing loosely in the slot in the lever, the throw of the upper or pawl-carrying end of the lever can obviously be changed as desired by raising or lowering the pin in the said slot to bring it nearer to or farther from the lever-pivot. By moving the pin down in the slot away from the lever-pivot the lever-arm, acted upon by the connecting rod or bar T, is obviously increased, so that the upper end of the lever will not be moved so far by the rod. This moving of the connecting-pin away from the center of motion of the lever as the roll on the reel increases is automatically performed as follows: As the roll grows larger, the slotted lever V is at its rear end, where it rests against the roll, forced down, so as to raise its forward end, upon which are the pins or studs V' V', engaging the slot in the bar $V^2$, which bar is attached at its rear end to the connecting-pin T', joining the bar T to the pawl-lever, as described. As the forward end of the lever V is forced down by the increasing roll, the forward end of bar $V^2$ and the pin are carried down, thus lengthening the part of the pawl-lever between such pin and the lever-pivot, with the result set forth above. As the rod T reciprocates, the slotted bar V² also slides on the pins V' V' on lever V, and its rear end will, with the pin T', pass closer to or farther from the pivot of the lever T³, according as the rear end of lever V is raised or lowered.

In practice it is intended to make the ratchet-wheel T⁵ and the meshing wheels T⁶ and U² of the same diameter as the reel. The automatic mechanism for adjusting the throw of the lever T³ according to the size of the bundle on the reel can then be easily arranged, so that the pin T' on the connecting-rod T, which engages the slot T² in the lever, will, when the reel is empty, be at its point of nearest approach to the pivot of the lever distant from such pivot an amount equal to the radius of the reel. As the bundle on the reel increases, the pin T' is moved farther and farther down in the slot in the lever, the increase in its distance from the pivot of the lever being made exactly proportional to the increase in the size of the bundle on the reel.

Having thus described my invention, what I claim is—

1. In a fence-machine, in combination with the twisters, slat or picket feeding devices continuously driven in the same direction, adapted to throw the pickets or slats into proper position with relation to the twisters, substantially as and for the purpose specified.

2. In a fence-machine, in combination with a suitable holder for the slats, slat-feeding devices continuously driven in the same direction and means for delivering the slats singly from the holder to the feeding devices, substantially as and for the purpose shown.

3. In a fence-machine, in combination with a feed roller or wheel continuously rotating in the same direction, a holder for the slats and means for moving a slat or picket from the holder into position to be engaged by the roller, substantially as and for the purpose set forth.

4. In a fence-machine, in combination with a pair of feed wheels or rollers continuously rotating in the same direction, a holder for the slats and means for moving a slat or picket from the holder into engagement with such wheels, substantially as and for the purpose shown.

5. In a fence-machine, in combination with the pair of feed-rollers for feeding a slat to the twisters, means for driving such rollers continuously, so that each constantly revolves in one direction, substantially as and for the purpose specified.

6. In combination with a pair of rotating feed wheels or rollers continuously rotating in always the same directions and a suitable slat or picket holder, means for moving the slats singly from the holder into the grip of the feed-wheels, substantially as and for the purpose set forth.

7. In combination with a suitable holder for the slats or pickets, the toothed feed-wheel continuously rotating in one direction, the rotating wheel above the toothed wheel journaled so as to be capable of movement away from the toothed wheel, spring mechanism pressing it toward such wheel, and means, substantially as described, for delivering the slats singly from the holder to these wheels, substantially as and for the purpose specified.

8. In combination with the two lower feed-wheels, the two corresponding upper feed-wheels journaled so as to be capable of movement away from the lower wheels, the yokes engaging the shafts of the upper wheels, and springs drawing such rollers downward, substantially as and for the purpose shown.

9. In combination with the stop for the slat as it is placed in position to be operated upon by the machine, the feed devices adapted to move the slat endwise against such stop, and so situated as to engage the end of the slat opposite to the stop when the slat is in contact with the latter, substantially as and for the purpose set forth.

10. In a fence-machine, in combination with the stop for the slat as the latter is thrown into position to be operated upon, feed wheels or rollers adapted to throw the slat into such position against the stop, and so situated as to still engage the slat end while its other end is engaged by the stop, substantially as and for the purpose described.

11. In a fence-machine, in combination with the slat-stop, the two feed-wheels, the lower one driven by suitable mechanism and the upper one journaled so as to yield away from the lower one, both wheels being so situated with relation to the stop as to engage one end of a slat while its other end engages the stop, substantially as and for the purpose specified.

12. In combination with the rack for holding the slats, a reciprocating slide and a pawl on the slide adapted to engage one of the slats in the holder, substantially as and for the purpose shown.

13. In combination with the slat-rack, the reciprocating slide below the same provided with means for engaging the bottom slat in the rack and moving it along out of the rack as the slide moves in one direction, substantially as and for the purpose set forth.

14. In combination with the slat-holding rack, the reciprocating slide below the same and the pawl pivoted on the outer end of the slide, so as to engage the end of the lowest slat in the rack when the slide has been moved outward and is drawn back inward, substantially as and for the purpose described.

15. In combination with the slat-holding rack, the reciprocating slide below the same and the pawl pivoted on the slide, so as to engage the outer end of the bottom slat in the rack and be rigid as the slide moves along in one direction and to yield and swing down under the next slat as the slide is moved back again, substantially as and for the purpose specified.

16. In combination with the slat-rack, the slide, the pivoted weighted pawl, and a stop for the pawl on the slide to limit its swing in one direction, substantially as and for the purpose shown.

17. In combination with the slat-rack and the feed devices at one end thereof continuously moving in one direction, means for moving one slat at a time from the rack to such feed devices, substantially as and for the purpose set forth.

18. In combination with the series of twisters, the carrier adapted to receive a slat as it is thrust in between the twister-arms, provided with rounded projections or pieces adapted to guide and hold the slat out of contact with the lower arms of the twisters, and the series of rounded guides above the carrier adapted to guide the slat out of contact with the upper arms of the twisters, substantially as and for the purpose specified.

19. In a fence-machine, in combination with the series of twisters between whose arms the slat to be operated upon is thrust, the rounded guide-pieces between the twisters adapted to guide the slat out of contact with the upper arms of the twisters, substantially as and for the purpose shown.

20. In a fence-machine, a carrier for receiving a slat and carrying it between the wires, pivoted so as to be adapted to swing in the plane in which the slat lies to adapt itself to the line of the slat side, in combination with stops against which the slat is carried, substantially as and for the purpose set forth.

21. In a fence-machine, in combination with the carrier for carrying the slats out from the twisters between the wires, pivoted so as to be capable of swinging in or parallel to the plane of a slat resting upon it, provided with suitable lugs or projections to engage the slat resting upon it, the stops against which the slat is moved by the carrier, substantially as and for the purpose specified.

22. In a fence-machine, in combination with the stops against which the slats are carried, the slat-carrier for carrying the slats out between the wires from the twisters and against the stops, pivoted so as to be capable of swinging to adjust itself to the position of the slat upon it and provided with lugs to engage such slat, and means for moving the carrier to and from the stops, substantially as and for the purpose shown.

23. In combination with the carrier provided at each end with a pin, the pivoted arms provided with upturned ends adapted to act as stops for a slat on the carrier when the arms are raised, and with slots engaged by the pins, so as to cause the arms to rise as the carrier moves outward, substantially as and for the purpose set forth.

24. In combination with the carrier and the pins on its ends, the pivoted arms having upturned ends and provided with the slots $p^4 p^4$, engaged by the pins, substantially as and for the purpose described.

25. In combination with the carrier and the pins thereon, the pivoted stop-arms having the upturned ends and each provided with a slot engaged by one of the pins on the carrier, such slot consisting of the upper and lower portions near the pivotal and outer ends of the arm, respectively, and the inclined portion connecting such other portions of the slot, substantially as and for the purpose specified.

26. In combination with suitable supporting-guides, a bar, means for moving the bar on the guides, and the slat-carrier pivoted to such bar, substantially as and for the purpose shown.

27. In combination with the bar and mechanism for moving it toward and from the series of twisters, the carrier pivoted upon such bar and provided with arms or lugs to engage the slat resting on and carried by it, substantially as and for the purpose set forth.

28. In combination with suitable guide-rails and the bar sliding thereon, provided with guides to engage the rails, the carrier pivoted to such bar and provided with slat-engaging arms or lugs and the stops for limiting the swing of the carrier, substantially as and for the purpose described.

29. In a fence-machine, in combination with the stops for engaging the outer sides of the slats as they are carried outward, means for raising the stops up into the track of the slats and lowering them again, and the moving slat-carrier pivoted so as to be capable of swinging to accommodate itself to the direction of the side of the slat not engaged by the stops, substantially as and for the purpose described.

30. In combination with the shaft, the fixed head thereon, the bars, the pivotal connections between such bars and the head, the second head made movable along the shaft, provided with sockets for the bar ends, and means for fixing the head to the shaft as desired, substantially as and for the purpose described.

31. In combination with the ratchet-wheel and means for driving it, the gear-wheel connected therewith, so as to turn with it, the reel-shaft, and the pinion on the shaft meshing with and driven by said gear-wheel, substantially as and for the purpose shown.

32. In combination with the reel and the slotted lever, pawl-and-ratchet mechanism and connecting-gearing whereby the reel is caused to rotate as the lever is swung on its pivot, a reciprocating rod provided with a pin engaging the slot in the lever, and a lever adapted to engage the roll of material on the reel, and connections between this lever and the pin on the reciprocating rod, whereby the pin is moved farther from the pivot of the slotted lever as the roll of material on the reel increases in size, substantially as and for the purpose set forth.

33. In combination with the reel and the slotted lever for driving the reel, connecting mechanism between the reel and the lever whereby the reel is driven as the lever swings, the pitman-rod provided with a pin engaging the slot in the lever, the slotted bar attached to the pin, the pivoted lever having one end in position to be engaged and depressed by the material wound upon the reel, and the pins or arms on the lever engaging the slot in the slotted bar, substantially as and for the purpose shown.

34. In combination with the pivoted lever having one arm so situated as to be engaged by the material wound on the reel, the pins or arms on the other arm of the lever, the bar provided with a slot engaging such pins, the slotted reel-driving lever, suitable connecting-gearing between the latter and the reel, the pitman-rod, and the pin on the same engaging the slot in the reel-driving lever and attached to the slotted bar, substantially as and for the purpose set forth.

35. In a fence-machine, the reel for coiling up the completed fence, having the two heads on its shaft, the bars between such heads, and the notches in the heads to receive the end slat or picket in the fence, substantially as and for the purpose specified.

36. In a fence-machine, the reel for rolling up the completed fence, having notches in its ends to receive the end slat in the fence, substantially as and for the purpose shown.

37. In combination with the reciprocating slat-carrier and the reel, the arm or lug moving with the carrier, the rock-shaft provided with the two cranks, the rod connecting said lug with one of these cranks, the pitman-rod connected with the other, the lever connected with the other end of such rod, and suitable connecting mechanism between this lever and the reel-shaft for driving the reel, substantially as and for the purpose described.

38. In combination with the slat or picket carrier for carrying the slats out between the wires, the swinging slotted arm, the pitman-rod connected with the arm and carrier, the rotary shaft, and the crank on the shaft provided with a pin engaging the slot in the swinging arm, substantially as and for the purpose specified.

39. In combination with the slat-carrier, the swinging slotted arm connected with the carrier by suitable connections, so as to actuate the same as the arm swings, the crank-arm provided with a pin engaging the slot in the swinging arm, and the rotary shaft carrying the crank-arm rotating in such direction that the crank-pin is farthest from the pivot of the swinging arm as it moves such arm to move the carrier outward, substantially as and for the purpose shown.

40. In combination with the arms carrying the stops for engaging the slats carried out between the wires, the slotted brackets, the pivot-pins for the arms passing through the slots in the brackets, and means for fastening the pins at any desired adjustment along the slots, substantially as and for the purpose described.

41. In combination with the twisting mechanism of a fence-machine, a swing-arm carrying a rack, connecting-gearing between the rack and the twister mechanism, a pin on the rack-arm, a crank on a driving shaft, a pitman pivotally connected with the crank and having a longitudinal slot engaging the pin on the rack-arm, so as to allow motion of the pitman independent of the rack-arm until the ends of the slot engage the pin, substantially as and for the purpose described.

42. In combination with the driving-crank, the pitman pivoted on the crank-pin and provided with a slot, the swinging rack-carrying arm, the pin on the arm engaging the slot in the pitman, the shaft, the pinion journaled on the shaft, clutch mechanism for rigidly connecting the pinion with the shaft as the pinion rotates in one direction only, the gear-wheel fixed on the shaft, the twisters geared together, and the pinion on the shaft of one of the twisters, substantially as and for the purpose shown.

43. In combination with a twister shaft or spindle, the gear-wheel fixed thereon, provided with a hub and with openings for the passage of the wires, the twister-head fixed on the shaft and provided with a reduced portion or hub, the twister-arms carried by this head, and suitable bearings in which are journaled the hubs on the gear-wheel and head, substantially as and for the purpose shown.

44. In combination with the series of twister-spindles, the gear-wheels fixed on the spindles, having hubs and openings for the passage of the wires, the heads on the spindles provided with hubs and with openings for the passage of the wires, the twister-arms carried by these heads, and suitable journal-bearings for the hubs on the heads and gear-wheels, substantially as and for the purpose shown.

45. In combination with the twister-head, the two arms pivoted in and passing through the head, provided with suitable guides for the wires, substantially as and for the purpose set forth.

46. In a twister, in combination with the twister spindle or shaft and the head thereon, the arms pivoted in and extending through the head, and links or bars connecting the ends of the arms opposite to those at which the twist is made with the spindle, substantially as and for the purpose described.

47. In combination with the twister-shaft and the head thereon, the twister-arms pivoted in and passing through the head, made adjustable, so as to bring their twisting ends near together or farther apart, as desired, substantially as and for the purpose shown.

48. In combination with the twister-shaft and the head thereon, the twister-arms pivoted in the head and adjustable connecting means between the shaft and the arm ends, substantially as and for the purpose shown.

49. In combination with the twister-shaft and the head thereon, the twister-arms pivoted in the head, slotted links pivotally connected with the shaft, and screws passing through the slots in the links and tapped into the twister-arms, substantially as and for the purpose set forth.

In testimony that I claim the foregoing I have hereunto set my hand this 26th day of June, A. D. 1886.

MATTHEW FRANKLIN CONNETT.

Witnesses:
I. K. BRADLEY,
S. HAMMENBAUGH.